US008571197B1

(12) United States Patent
Chartrand (10) Patent No.: US 8,571,197 B1
(45) Date of Patent: *Oct. 29, 2013

(54) DIRECT DIALING TELEPHONE CALLS BY NAME

(76) Inventor: Victor Chartrand, La Quinta, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/136,001

(22) Filed: Jul. 20, 2011

Related U.S. Application Data (63) Continuation-in-part of application No. 13/068,819, filed on May 21, 2011, which is a continuation-in-part of application No. 12/930,075, filed on Dec. 27, 2010, which is a continuation-in-part of application No. 12/462,549, filed on Aug. 5, 2009, now Pat. No. 7,889,855, application No. 13/136,001, which is a continuation-in-part of application No. 12/928,181, filed on Dec. 6, 2010, which is a continuation-in-part of application No. 12/228,717, filed on Aug. 15, 2008, now Pat. No. 7,848,508.

(60) Provisional application No. 61/188,202, filed on Aug. 5, 2008, provisional application No. 60/965,379, filed on Aug. 17, 2007.

(51) Int. Cl.
*H04M 3/42* (2006.01)

(52) U.S. Cl.
USPC ............ 379/211.01; 379/211.02; 379/221.01; 379/221.14; 379/100.09

(58) Field of Classification Search
USPC ............. 379/211.01, 211.02, 221.01, 221.14, 379/100.09
See application file for complete search history.

(56) References Cited

U.S. PATENT DOCUMENTS

| | | | |
|---|---|---|---|
| 3,634,631 A | 1/1972 | Youngs | |
| 3,870,821 A | 3/1975 | Steury | |
| 5,018,191 A | 5/1991 | Catron et al. | |
| 5,157,719 A | 10/1992 | Waldman | |
| 5,274,693 A | 12/1993 | Waldman | |
| 5,402,481 A | 3/1995 | Waldman | |
| 5,467,390 A | 11/1995 | Brankley et al. | |
| 5,583,925 A * | 12/1996 | Bernstein | 379/202.01 |
| 5,742,666 A | 4/1998 | Alpert | |
| 5,963,636 A | 10/1999 | Boakes | |
| 6,285,753 B1 | 9/2001 | Slusher | |
| 7,039,174 B1 | 5/2006 | Chartrand | |
| 7,848,508 B1 | 12/2010 | Chartrand | |
| 2006/0195540 A1 | 8/2006 | Hamilton et al. | |

* cited by examiner

*Primary Examiner* — Quynh Nguyen

(74) *Attorney, Agent, or Firm* — Robert M Hunter (57) ABSTRACT

By using letters, this invention provides telephone numbers that contain the actual initials or name of the recipient. With business subscribers, each company's stock marker ticker symbol is their telephone number, such as 'GE' for General Electric. Custom programming routes a call with the simple dialing input of only the recipient's initials or name. Only one well-defined area code is needed per State, such as 'AZ' for Arizona. The same number is used for landline, facsimile, special feature, and cellular connections. Telephone numbers are permanent and fixed for the life of the subscriber. Global call numbers, such as GE's, shrink from 011-44-207-302-6000 to 'UK-LO-GE.

44 Claims, 1 Drawing Sheet

DIRECT DIALING TELEPHONE CALLS BY NAME

CROSS-REFERENCE TO RELATED APPLICATIONS

This application is a continuation in part of U.S. patent application Ser. No. 13/068,819, filed May 21, 2011, which is a continuation in part of U.S. patent application Ser. No. 12/930,075, filed Dec. 27, 2010, which is a continuation in part of U.S. patent application Ser. No. 12/462,549, filed Aug. 5, 2009, now U.S. Pat. No. 7,889,855, which claims the benefit of U.S. Provisional Patent Application No. 61/188,202, filed Aug. 5, 2008, the disclosures of which patent applications and patent are incorporated by reference as if fully set forth herein. U.S. patent application Ser. No. 13/068,819, filed May 21, 2011, is also a continuation in part of U.S. patent application Ser. No. 12/928,181, filed Dec. 6, 2010, which is a continuation in part of U.S. patent application Ser. No. 12/228,717, filed Aug. 15, 2008, now U.S. Pat. No. 7,848,508, which claims the benefit of U.S. Provisional Patent Application No. 60/965,379, filed Aug. 17, 2007, the disclosures of which patent applications and patent are incorporated by reference as if fully set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to telecommunication systems and methods. In particular, the invention relates to telecommunication systems and methods that rely on direct telephone dialing by name.

The ongoing background art is characterized by U.S. Pat. Nos. 3,634,631; 3,870,821; 5,018,191; 5,467,390; 7,039,174; 7,848,508; and 7,889,855; the disclosures of which patents are incorporated by reference as if fully set forth herein.

BRIEF SUMMARY OF THE INVENTION

The purpose of an illustrative embodiment of the invention is to provide an exceptional telecommunications system that communicates by name instead of by number. One advantage of an illustrative embodiment of the invention is that telephone numbers are permanent and fixed for life.

In an illustrative embodiment, the invention is a system and method for receiving telephone user input and routing telephone calls. In a telecommunications system that is capable of routing telephone calls to a communications device of a particular subscriber, an illustrative embodiment of the invention is a system for routing a telephone call from a caller to said specific communications device, said system comprising: means for assigning a first telephone number to the particular subscriber; and means for routing the telephone call to the specific communications device of the particular subscriber said means for routing being programmed to recognize a subscriber's name; wherein said subscriber's name is a sequence of characters established in accordance with one of the schemes disclosed herein.

Illustrative embodiments of the invention provides major advances in telephone technology that include: well known telephone numbers of only one to four letters to reach 10,000 companies, fully permanent telephone numbers by name for individuals and companies, one single telephone number to cover landline, facsimile, special features, and cellular calls, the replacement of 301 area codes with one permanent area code per State, the use of only a recipient's two initials or first name to dial a call, a telephone number that is permanent from the day that one was born for life, and a gigantic reduction in the number of keystrokes involved in global calling numbers, such as a reduction from 011-44-207-302-6000 down to 'UK-LO-GE.

With the present system of using numbers for telephone numbers, there is no way of addressing business or individuals by name. By using letters of the alphabet, an illustrative embodiment of the invention makes most major U.S. companies capable of being reached directly, with an updated landline or cellular telephone, by simply dialing their stock market ticker symbol (ticker). For example, in accordance with an illustrative embodiment of the invention, the following are used to reach the indicated company: GE (General Electric), F (Ford Motor), GOOG (Google), IBM (IBM), INTC (Intel), KO (Coca-Cola), MSFT (Microsoft), SNE (Sony), T (AT&T), TGT (Target), WMT (Wal-Mart), YHOO (Yahoo!), etc.

There are over 10,000 companies that are already assigned a letters-only ticker symbol, that are readily available to become the actual phone number of each company. In an illustrative embodiment, the telephone numbers of businesses are distinguished from those of individuals by using a prefix such as the equivalence (tilde) mark '~', or any other (preferably non-letter and non-digit) character that is available on the American Standard Code for Information Interchange (ASCII) chip. In this embodiment, to get GE's national and local options, calls would be routed directly to their corporate or other office in Connecticut simply by dialing ~GE. If the State is needed, a memory bank in the call routing software of the telephone company automatically provides the State. In this preferred embodiment, a caller can establish a direct connection with a major company like General Electric, without using a State area code, simply by dialing ~GE.

Other State area codes are envisioned, such as AZ~GE for information about the company in Arizona. In this embodiment, in one's home State, no area code is required. The combination of a state code plus a tilde notifies the routing software that the first two letters are area codes for long distance. This replaces the background art system of dialing a '1' for long distance. In all routings, companies should preferably offer their ticker numbers as toll free numbers.

The ticker's use of 26 letters or variables, per digit, and the use of four digits provides a vast and apt reserve of 456,976 ticker symbols (26×26×26×26). Only 676 tickers with one or two digits are available, yet many of these are not currently in use. Thus, for major private or other unlisted companies, an unused ticker symbol is available.

In an illustrative embodiment, the invention utilizes the present 10-character telephone numbers that include: two characters such as 'CA' for the State area code, one tilde character '~' to signify business telephone numbers, four digits maximum for the ticker symbol which does the routing of the call, and three unused characters 'xxx' such as CA~GOOGxxx. With Ford Motor Company's one-character ticker, there would be a rare surplus of six unused characters, that Ford could utilize, such as CA~Fxxxxxx. In an illustrative embodiment, the first character following the upper-case ticker characters, is a lower case letter or a number or a dot to isolate a company's ticker or other symbol from the other characters, for example, ~GErm or ~GE.RM, and so insure proper call routing. Only 26 one-character tickers are available and in case their use is not practical or feasible, in an illustrative embodiment one extra upper case letter 'O' is added, such as '~OF'. Keyboards have the '~' tilde key.

A major breakthrough is the use of short ticker symbols that allow companies to customize the unused portion, shown as 'xxx' above, of their incoming telephone number. Depending on ticker length, three to six unused characters are available, which can be coded to greatly reduce consumer hang time by bypassing answering machines and switchboards and by accelerating the routing to various contacts. The three to six characters may be coded to direct a telephone call to a specific telecommunications outlet, such as a company department, or vendor of company products, or extension number, or name, or initials, etc.

In another illustrative embodiment wherein the telephone number comprises a four-character ticker, three-character directives are created as follows: initials '.RM' such as CA~GOOG.RM, or extension number '234' such as CA-GOOG234, or initials 'rml' in case of a duplication, or lower case of both initials with a dot '.rm' for a facsimile, or a positive directive for 'fax' or 'cel', or the city initials and store number such as 'ps1' for Palm Springs location 1, or the owner or associate's name such as 'bob' or 'sue', or a company department such as '.OP' for operator, or '.CS' for customer service such as CA~GOOG.CS, etc. Preferably, non-ticker companies use seven characters to form their title symbol and directive code.

In another illustrative embodiment, individuals are assigned national telephone numbers based on their initials. One of the revolutionary features of preferred embodiments of this invention is that the individual's local landline telephone number is permanent and fixed for life. The user is born with a telephone number consisting of his or her two-letter initials, followed by the user's birth date consisting of two digits for the year born, plus the two-letter 'State' or remaining country code (e.g., AZ for Arizona) for the location at which the individual was born, plus a lower case letter indicating the month in which the individual was born, such as RM51AZj for a local landline telephone number of a person with the initials RM who was born in January 1951 in Arizona. In an alternative embodiment, with a long distance call, the last two characters (character number 8 and character number 9) consist of an abbreviation for the state of residence of the individual, e.g., RM51AZjCA. In an alternative embodiment, the month born-in is replaced with the city born-in using characters number seven and number eight, e.g., RM51AZpxCA.

In embodiments of the invention disclosed in the parent application, the birth-date telephone number requires a prefix with an abbreviation of a 'State' for a long distance call and also requires a specific number for the day of birth as character number 6 and character number 7. The embodiment disclosed herein eliminates the prefix and relocates abbreviation of the home State (the State in which the individual's landline telephone is located) at the end of the telephone number, and also replaces the 31 days of birth in character number 6 and character number 7 with a two-letter abbreviation of one of 76 'States' or 240 countries, the one in which the individual was born. In the embodiment disclosed herein, an abbreviation of one of these 316 locations now appears as character number 5 and character number 6 prior to an indication of the month in which the individual was born. (For the purposes of this disclosure, the term 'State' means one of the 50 U.S. States plus the District of Columbia, 12 Canadian Provinces plus Territories, and 13 Caribbean countries. For the purposes of this disclosure, the term remaining country means a country that is not a 'State'.) With a small increase in the originally proposed numbers of characters, the embodiment disclosed herein eliminates the need for 265 area codes and over 200,000,000 prefixes.

In an illustrative embodiment, dialing a local telephone number does not require the inclusion of the home State and consists of only seven characters, such as RM51AZj, to which the routing system software preferably adds the State automatically. In this embodiment, the routing system software readily decodes the eighth and ninth character to determine whether the call is an local destination (in which case the 'State' was not dialed) or an out-of-State destination (in which case the 'State' was dialed).

Among the 76 'States' and 240 countries, 29 abbreviations are identical, which are AL, AZ, AR, CA, CO, CT, GA, IL, IN, KS, LA, ME, MD, MA, MI, MN, MS, MO, MT, NE, NV, NL, NC, PE, SK, SC, SD, TN, and VT. To avoid this conflict, upper case letters are used for all 'States' and 211 unshared countries (the countries that do not share abbreviations with 'States') and lower case letters are used for the 29 shared countries listed above.

Alternatively, only upper case letters are used, and in this embodiment, the routing system software notes the use of one the 29 items, such as IN, and presents a choice to the individual of either 'IN' Indiana or 'in" India. In any of these instances, the selection of the case level of the 'State' or remaining country abbreviation is obtained by either of the approaches disclosed herein. For example, the telephone number of RM51INsb is used for a local call to a subscriber with telephone service in California, in which the subscriber, RM51, was born in South Bend, Indiana. In a lower case example, the telephone number of RM51inmmAZ is used for an out-of-State call, to a subscriber who was born in Mumbai, India and who has service in Arizona.

Below are abbreviations for 26 U.S. States and 3 Canadian Provinces that would otherwise be shared with 29 other countries:

| Abbreviation | State or Province | Other Country |
| --- | --- | --- |
| AL | Alabama | Albania |
| AZ | Arizona | Azerbaijan |
| AR | Arkansas | Argentina |
| CA | California | Canada |
| CO | Colorado | Columbia |
| CT | Connecticut | Croatia |
| GA | Georgia | Gambia |
| IL | Illinois | Ireland |
| IN | Indiana | India |
| KS | Kansas | Korea, South |
| LA | Louisiana | Laos |
| ME | Maine | Mayotte |
| MD | Maryland | Madagascar |
| MA | Massachusetts | Macedonia |
| MI | Michigan | Maldives |
| MN | Minnesota | Monaco |
| MS | Mississippi | Montserrat |
| MO | Missouri | Morocco |
| MT | Montana | Malta |
| NE | Nebraska | Niue |
| NV | Nevada | Nevis |
| NL | Newfoundland | Netherlands |

-continued

| Abbreviation | State or Province | Other Country |
|---|---|---|
| NC | North Carolina | New Caledonia |
| PE | Prince Edward Islands | Peru |
| SK | Saskatchewan | Slovakia |
| SC | South Carolina | Seychelles |
| SD | South Dakota | Sudan |
| TN | Tennessee | Tonga |
| VT | Vermont | Vatican City |

In a more illustrative embodiment of a major variable-case feature of the invention, upper case initials are used for landline telephone numbers, e.g., RM51AZj, and lower case initials for cellular telephone numbers, e.g., rm51AZj. The more frequently-dialed cellular calls may be typed faster in lower case because they do not require the shift key for upper case. In this embodiment, the one-character code for the month in character number 7 is dialed as a lower case letter to provide a lower profile among upper case items. In this embodiment, the first letter of each month is used, except for May, June, July, and August, for which preferably 'w', 'x', 'y', and 'z' are used.

A more preferred embodiment of this variable-case feature allows for dialing four separate communication devices in providing for landline, facsimile, internet, and cellular service. This would be a major advance in technology. This is possible because of the four unique options that are provided by the upper and lower case of a subscriber's two-letter initials. For example, in an illustrative embodiment, upper case 'RM' is used for a landline telephone (e.g., RM51AZj), or 'Rm' for the facsimile address, or 'rM' for special features, or lower case 'rm' for a cellular telephone (e.g., rm51AZj). A person having ordinary skill in the art would understand that each combination of letters could be used for any type of communications device.

In an illustrative embodiment, the 'rM' option provides a connection to various tables of special personal features, such as lists of medical expenses, prescriptions, property taxes, full telephone numbers of businesses that have been called, full names of persons that have been contacted using two or more letters (e.g., initials, or names, or abbreviations, etc.). In this embodiment, such tables are displayed on a monitor/screen that is either internal to the telephone, as with cellular, or external on a monitor that is connected to the telephone, or on a separate device such as a computer, etc.

A major feature of this embodiment is that the two initials act as the telephone number. In this embodiment, when dialing an out-of-State call using a telephone number consisting of a recipient's two initials such as 'RM' and before pressing 'send', the telephone of the sender is pre-programmed in its memory bank (or block) to (substantially instantly) convert the dialed 'RM' to RM51AZjCA. For a call to 'JM' in Florida (FL), an exemplar conversion is JM78AZxFL, where the 'x' indicates the month of June. In this embodiment, if '~GE' were dialed, the call is directed to RM's office extension, such as ~GE.RM123.

Preferably, the processor in the sending telephone performs conversions of any two to seven characters that the caller programs into the telephone. For example, in an illustrative embodiment, 'WG' is dialed to reach Walgreens Drugs. Also, if 'RM' is taken, either RM1, or the full name Renee, or the letters Re, etc. are dialed to reach RM1's communication device. The simple task of dialing a known recipient by name with two to seven digits, without looking up the name, and selecting and dialing lengthy numbers, is a major breakthrough for owners, directors, managers, and parents who are instantly contacting their employees, agents, siblings, etc. For example, RM could contact her three children by cellular phone by simply dialing their initials 'jm', 'lm', or 'mm'.

The feature of making telephone calls by dialing only two characters (the call recipient's initials) greatly reduces (by five) the number of keyboard strokes required with a background art systems' seven-digit local telephone number. Moreover, it reduces by nine the number of keystrokes required with the background art systems' eleven digit local telephone numbers that include an area code. If the 200 million users of background art telecommunications systems make only two each of such two-character telephone calls daily, the invention would reduce the overall task by a massive 5.6 billion keystrokes per day.

The applicant understands that some users might object to the system described above that uses birth dates for telephone numbers as an invasion of privacy. In such a case, the year of birth may be easily hidden by replacing the two numbers of birth year with two letters that have unpublished corresponding numbers assigned to each letter, such as 1=a, 2=b, 3=c, etc. There are twenty-six letters available to denote each number. For subscribers with no birth records, estimated birth years may be listed normally with numbers, or listed as above with letters concealing the numbers. Partial identification of each subscriber (customer) by their telephone number is a decisive advance in national security.

It is highly unlikely, but in cases in which objecting subscribers legally block the use of any personal data in their telephone number, an alternate six-character telephone number is envisioned that comprises two letter initials plus four letters, such as RMxxxx. The letters are whatever the subscriber chooses, such 'john' or 'star', etc. A five-character embodiment of the invention may be considered, but its capacity of 11.8 million telephone numbers is considered by the applicant to be too low to include all the objectors.

The approach to assigning a local telephone number, such as RM51AZj, that is disclosed herein provides a huge area code capacity that is over 500 million more telephone numbers than the 7.92 million accommodated by background art systems. With variables of 26 letters, 10 numbers and 12 months, the capacity is 26×26×10×10×25×26×12 which equals 527.2 million. (The fifth character is limited to 25 choices because one letter is not used.) The background art telecommunications system, with it ten-digit telephone numbers (and with seven digits in use in each area code) provides only 10 million telephone numbers per area code (10×10×10×10×10×10×10). Subtracting two million unused numbers starting with 0 for operator and 1 for long distance and with 80,000 numbers reserved by the telephone company, each background art area code is left with only 7.92 million telephone numbers for landline service.

Illustrative embodiments of this invention increase the landline capacity of each area code from the present maximum of 7.92 million to an astounding 527.2 million. Thus, only one area code would ever be required per 'State'. Area codes would be the well-known two-letter code used by the U.S. Postal Service, such as AL, AK, AZ, AR, CA, etc. Area codes could be eliminated altogether with one main distribution center for the whole country, but a more preferred embodiment maintains one area code per 'State', because of the existence of separate telephone companies and individual State laws, instead of processing telephone numbers in one system. Moreover, with this embodiment, there would be a fifty times larger choice of numbers; that is, one full set per 'State'.

On international calls to the United States, Canada and the Caribbean countries, 341 different three-digit area codes are presently required by background art telecommunications systems. In an illustrative embodiment of the present invention, the 301 U.S. codes of this cumbersome technique are replaced by 51 two-character (two-letter) post office codes (one for each U.S. State and the District of Columbia), such as AL for Alabama, AK for Alaska, etc. In addition, Canadian area codes are reduced by 14 (from 26 to 12) by providing only one area code per Province or Territory. In this embodiment, the area codes of the 13 Caribbean countries are reduced by one (from 14 to 13 area codes) and they are treated like U.S. States in an illustrative embodiment of the invention. Preferred embodiments of this invention eliminate 265 area codes from the present number of 301 U.S. area codes, 26 Canadian area codes, and 14 Caribbean country area codes to a reduced number of 51 U.S. area codes, 12 Canadian area codes, and 13 Caribbean country area codes. This reduces the number of area codes from 341 to 76.

With the elimination of 265 area codes, keystrokes by callers are reduced. If 200,000,000 callers make an average of ten area code calls per day, with three keystrokes per area code, illustrative embodiments of the invention require six billion fewer keystrokes per day. Illustrative embodiments of the area codes disclosed herein use the two-digit post office codes, and with an average of five area code calls per day, dialing at least one less digit, saves another one billion keystrokes per day. As was noted previously, dialing two initials saves 5.6 billion keystrokes per day. These figures are based on an estimated number of callers and an estimated number of phone calls being made by each caller, and will vary according to the actual number of callers and calls. Overall, with preferred embodiments of the invention, keystrokes are reduced enormously by an estimated 12.6 billion keystrokes per day.

In another illustrative embodiment of the invention, long distance calls to the 218 other remaining countries would still require the use of digits until they switch to letters. Meanwhile, partial implementation of the invention in dialing long distance to said 218 remaining countries would involve replacing the background art 011 with a reverse quote, and by replacing the country numbering code of two to four digits with the two-letter country code (i.e., the two-letter abbreviation of the remaining country being called) disclosed herein. The remaining parts of the background art telephone number would not change in this embodiment.

In this embodiment, a person being called in one of the remaining 218 countries (240 less U.S., Canada, 13 Caribbean countries, and 7 Protectorates) is reached by dialing a reverse quote '`' followed by the two-letter country abbreviation of the remaining country being called, which the routing system automatically converts, from a recognizable code of a reverse quote followed by a two-letter abbreviation of the remaining country being called, such as '`UK or '`FI, etc., to the background art code of five or six digits, such as 011-44 for UK or 011-358 for FI (Finland), etc. In this embodiment, the two-letter abbreviation of the remaining country being called is followed by the numerical code (digits) of the city where service is provided and by the numbers (digits) of the local telephone number being called.

For example, the full telephone number for a call addressed to GE within the United Kingdom is 011-44-207-302-6000, in which 207 is the city of service, London, followed by the local telephone number. After the United Kingdom installs the dial-by-name feature of this invention, the call to GE would be '`UK-LO-GE.

This embodiment requires 8 less keystrokes per call and is a vast improvement over the background art. At a low daily average of two such country calls per subscriber, the approach disclosed herein decreases keystrokes by a huge 3.2 billion keystrokes per day (2 calls×8 less keystrokes×200 million subscribers). Shorter dialing times means less labor and faster service. The reverse quote '`' is available on the keyboard on the same key as the tilde mark '~'.

In the case of out-of-country calls in which the country from which the call is being made has implemented the dialing by name features of this invention, the telephone number comprises a reverse quote followed by a two-letter code of the remaining country being called, which is followed by the initials of the person being called with the full telephone number of the person being called, the last two letters of which indicate the city, or other location of service, of the person being called. If the location of the residence of the person being called is within a 'State' in which the subscriber subscribes, the call is dialed locally without dialing the reverse quote. In an illustrative embodiment, the telephone number comprises, in its last two letters, an abbreviation of the location of service within the 'State' where the subscriber subscribes, which could be one of the 51 U.S. States or District of Columbia, or one of the 12 Canadian Provinces or Territories, or one of the 13 Caribbean countries, or it could be a city in any one of the above 76 'States', to which the call will be routed.

As an alternate embodiment to using one of the 76 'State' abbreviations as the last two letters of the telephone number to indicate the service location of the party being called, an abbreviation of a major city within a 'State' could also be used to indicate the service location of the party being called. Preferably, only abbreviations of high population cities would be used to limit the number of city abbreviations. In this embodiment, the first letter of the abbreviation is upper case and the second letter is lower case to indicate it is a city and also to avoid duplication with any other abbreviation. This embodiment could be another method of avoiding a duplicate telephone number among subscribers.

Any city size cutoff could be used, but if only cities over 1,500,000 population are used, in this embodiment, there would be forty-five said city abbreviations. Examples are as follows:

| U.S. Cities | | | |
|---|---|---|---|
| Al Albuquerque | Dn Denver | La Los Angeles | Po Portland |
| At Atlanta | Dt Detroit | Mm Memphis | Sa San Antonio |
| Au Austin | El El Paso | Mi Milwaukee | Sd San Diego |
| Ba Baltimore | Fw Fort Worth | Na Nashville | Sf San Francisco |
| Ch Charlotte | Ho Houston | Ny New York | Sj San Jose |
| Cc Chicago | In Indianapolis | Ok Oklahoma | St Seattle |
| Co Columbus | Ja Jacksonville | Ph Philadelphia | Tu Tucson |
| Da Dallas | Lv Las Vegas | Px Phoenix | |
| Canada Cities | | | |
| Cg Calgary | Ms Mississauga | Qc Quebec | Wi Winnipeg |
| Ed Edmonton | Mo Montreal | To Toronto | |
| Ha Hamilton | Ot Ottawa | Va Vancouver | |
| Caribbean Cities | | | |
| So Santo Domingo | | Pp Port-au-Prince | |
| Sc Santiago de los Caballeros | | Ki Kingston | |

Moreover, in some embodiments of the invention, dialing a major U.S. company does not require dialing an area code. Dialing the letters of a U.S telephone number on international calls may be accomplished using a personal computer when the subscriber is not using the telephone line to establish an Internet connection, or any time, when the system is a high speed line using a high frequency for the Internet and a low frequency for audio. The latest cell phones may also be used. If only numbers can be dialed by a subscriber, conversion from numbers to letters is provided (e.g., by means of a processor and conversion tables). However, as an alternative to said conversions, other embodiments of the invention have the full capability of using telephone numbers comprising letters and/or digits and so can communicate using telephone numbers comprised solely of digits with subscribers who are still using a telecommunication system that relies on telephone numbers that are comprised of digits.

Other examples of codes that may be used with some embodiments of the invention include seven Protectorates: AS for American Samoa, FM for the Federated States of Micronesia, GU for Guam, MH for the Marshall Islands, SN for Saipan in the Northern Mariana Islands, PU for Palau, and UM for U.S. Minor Outlying Islands. Two character (letter) codes are available for each of the twelve Canadian Provinces plus its main Territories and for the thirteen Caribbean countries. The twelve official Canadian Post Office codes are: Alberta AB, British Columbia BC, Manitoba MB, New Brunswick NB, Newfoundland NL, Northwest Territories NT, Nova Scotia NS, Ontario ON, Prince Edward Island PE, Quebec QC, Saskatchewan SK, and Yukon YT. The thirteen Caribbean countries are: Antigua AN, Bahamas BS, Barbados BB, Bermuda BM, Cayman Islands CI, Dominican Republic DR, Grenadines GD, Jamaica JM, Puerto Rico PR, St. Lucia LU, St. Vincent VC, Trinidad TT, and U.S. Virgin Islands VI. In preferred embodiments, telecommunications service is provided directly to the 'States' which include the U.S., Canada, and Caribbean countries and indirectly to the Protectorates. The total of 240 countries to which telecommunications service is provided in the illustrative embodiments described herein, less the above 22 countries, leaves 218 other countries, each one of which is referred to individually herein as a "remaining country."

The five main birth attributes, such as year born, month born, day born, 'State' or remaining country born in, and city born in can be used in various combinations and levels to provide an infallible telecommunications system. A random sample study of the birth attributes of the participants may be undertaken to determine an optimal configuration. However, to avoid the possibility of any number duplication, a more preferred embodiment is disclosed herein that provides a drastic long term segregation of telephone numbers. In this embodiment, an extra character number eight is added next to character number 7, which is not used for the born-in month. These characters designate the city (over 100,000 population) in which the subscriber was born. The largest city is used for sixty countries that do not have any cities over 100,000 population. Overall, this approach includes 340 local cities (273 in the U.S., 48 in Canada, and 19 in the Caribbean), plus over 3,460 cities located in the remaining 225 other countries. With this embodiment, the choices per subscriber increases from 12 months born in to 3,800 cities born in.

Arizona, for example, has seven cities over 100,000 population, such as Phoenix (px), Tucson (tu), Mesa (ma), Glendale (gl), Scottsdale (sc), Gilbert (gb), Peoria (pr), plus other (ot). With this embodiment of the invention, an exemplar permanent local telephone number for a subscriber born in Phoenix, Ariz. is RM51AZpx. This approach increases the area code capacity from the meager background art capacity of 7.92 million to a huge 29.7 billion telephone numbers (26×26×10×10×25×26×26×26). This embodiment of the invention requires only eight characters, which is well below the eleven digits required by background art local telephone numbers that contain an unwanted area code. The city abbreviations are in a separate group in 'Arizona' and are independent of any used in other 'States' or countries. In this embodiment, the city abbreviation is in the lower case and disposed between the born-in 'State' and the 'State' in which the subscriber's landline is located. In this embodiment, the telephone number is dialed from a home State such as California to another area code such as Nevada, as RM51AZpxNV.

The choice of cities by population provides an optimal way to spread the choices over an even distribution of territory. California, for example, with the highest 'State' population, has the most cities (at 59) over 100,000 population. More importantly, the population figure of 100,000 may be adjusted up or down to achieve the best working configuration. If the choice of cities is rarely needed to avoid a duplication of telephone numbers, the 100,000 city-size limit may be increased to decrease the cities available for choice below 3,800. Otherwise, if a greater number of choices are needed, the 100,000 number may be decreased to provide any increase in city choices required. In case of a no-city match-up in which the subscriber was not born in a selectable city, all countries have an 'ot' (other) choice, the use of which provides evidence of which the way the 100,000 number may be adjusted by the telecommunications system operator, if appropriate.

If a very rare case arises in which an applicant for telephone service has the same telephone number as a subscriber, there are several options other than adjusting the 100,000 city level. If they both choose other 'ot' for their city born-in, the actual born-in city is designated for the new applicant. If the city in which the new applicant was born is unknown, then a 'uk' is used as the city in which the new applicant was born. If they both choose Phoenix 'px' for example, a different abbreviation, such as 'ph' or 'pn' etc, is available or simply a 'pp', or an 'aa', or a 'bb' or a 'cc', etc. is selected.

The area code capacity of an exemplar telecommunications system in which local telephone numbers of the type RM51AZj are used is 527.2 million (26×26×10×10×25×26× 12). This eliminates the problem of 'State' populations exceeding the present capacity of an area code (7.92 million), which results in many extra area codes being needed per 'State'. California has the largest population (near 36.5 million) with 59 cities above the 100,000 level. The CA area code could be split into CN for northern California and CS for southern California. In either case, twenty-five California numbered area codes are being eliminated with the invention disclosed herein. Overall, China has the most cities over 100,000 population, with 445. With area codes consisting of two letters, each remaining country has the capacity to provide an abbreviation for 676 cities (26×26).

With an illustrative embodiment of this invention, each GE employee, for example, may reach any of GE's others employees simply by dialing the call to the recipient's initials (preferably the recipient's first and last initials) such as 'RM'. This is preferably set up as a direct one-way serial transmission, or is directed to a GE memory bank or block for conversion of the telephone number to RM's office extension number. Many inputs of two or three characters could also be used, such as: RM1 (duplicate initials), CS (customer service), LOB (lobby), SEC (security) etc. With some employees, lower case initials could direct the call to a cellular telephone.

In another illustrative embodiment, the website address (on the Internet) is obtained from a database or memory bank when addressed by a business subscriber's telephone number containing a 'corn' in its three unused digits. A prefix 'www' and a suffix '.com' or '.gov' etc. are added automatically or manually when dialed if the database output is a browser address. Furthermore, in this embodiment, the 'com' directs a call of said telephone number to a database or memory bank which provides the Internet browser address of said business, or provides an access number to a business with an internal in-house website which is not on the Internet.

In another illustrative embodiment, telephone equipment in accordance with the invention is designed to process letters and numbers. Preferably, a communications device (e.g., a telephone) is provided that can answer at least two separate input phone numbers, either with a dual response line or with an extra line via its antenna. Preferably, the telephone equipment provides a user with the outstanding feature of having separate business and residence numbers on the same telephone. In illustrative embodiments, no new electronic design would be required. In this embodiment, the telephone is programmed for the work number and for the residence number.

This invention can be readily incorporated into the present-day communication system. Illustrative embodiments use the same ten digits that are presently used for telephone numbers. Primarily, new software would be required. Letter keys are already available on new cellular telephones which feature a computer keyboard. In these telephones, the same common integrated circuit chip, used in millions of personal computers, is available to convert each of up to 127 input keys, including each one of upper case letters, lower case letters, numbers, punctuation, equivalence/tilde mark, etc., into a 7-bit binary symbol, in accordance with the standard ASCII digital coding scheme.

By dialing for companies with known ticker symbols, and by dialing for individuals using known initials, and by providing the U.S. Homeland Security Department with a major upgrade from this national tie-in of names, and by using known State or other governmental jurisdictional area (e.g., province, territory, island or island group) abbreviations for area codes, and by using only one area code per State or other governmental jurisdictional area, and by using only the two initials of the recipient to dial a call, etc, this invention offers tremendous superiority over the background art of an overloaded system of non-informative, hard-to-remember numbers with a clutter of 341 area codes, and also offers a tremendous reduction of many billion symbols being typed every day.

In a telecommunications system that is capable of routing (operative to route) telephone calls to a specific communications device of a particular subscriber, an illustrative embodiment of the invention is a (routing) system for routing a telephone call from a caller to said specific communications device, said (routing) system comprising: means for assigning a first telephone number to the particular subscriber; and means for routing the telephone call to the specific communications device of the particular subscriber by recognizing said first telephone number; wherein if the telephone call is directed to a business that is located within the state in which the caller is located, said first telephone number comprises a tilde followed by a one-letter to four-letter stock ticker symbol.

In an illustrative embodiment of the invention, when a caller first contacts a company by dialing its (preferably toll-free) ticker symbol preceded by a tilde (such as '~GE'), the caller is connected to a GE operator who determines the appropriate complete telephone number which may contain the involved State and either a GE department or a vendor of GE products, plus a three to five character add-on signifying the extension, or group, or name, or initials, etc. If a destination in the caller's home State is selected by the operator, the State is included automatically and need not be dialed. The operator may direct the call to a regional specialist for local information. The presence of the combination of the two-letter abbreviation of the U.S. State, or Canadian Province or Territory, or Caribbean country and the tilde which follows it (e.g., 'NY~GE') enables the routing system software to determine that the call is a long distance call. The tilde's primary function continues to be indication that a ticker symbol following the tilde is a telephone number.

In a telecommunications system that is capable of routing telephone calls to a specific communications device of a particular subscriber, an illustrative embodiment of the invention is a system for routing a telephone call from a caller to said specific communications device, said system comprising: means for assigning a first telephone number to the particular subscriber; and means for routing the telephone call to the specific communications device of the particular subscriber by recognizing said first telephone number; wherein, if the telephone call is directed to a business that is or may be located outside of the State, Province, Territory, island or island group) in which the caller is located, said first telephone number comprises a two-letter State, Province, Territory, island or island group abbreviation, followed by a tilde, followed by a one-character to four-character stock ticker symbol. Preferably, said first telephone number comprises a two-letter State abbreviation, followed by a tilde, followed by a one-letter to four-letter stock ticker symbol, followed by three to six characters, directing the telephone call to the specific communications device (e.g., 'AZ~GEx110').

In a telecommunications system that is capable of routing telephone calls to a specific communications device of a particular subscriber, an illustrative embodiment of the invention is a system for routing a telephone call from a caller to said specific communications device, said system comprising: means for assigning a telephone number to the particular subscriber; and means for routing the telephone call to the specific communications device of the particular subscriber by recognizing said telephone number; wherein said first telephone number is selected from the group consisting of: if the telephone call is directed to a business that is located within the 'State' in which the caller is located, said telephone number comprises a tilde followed by a one-letter to four-letter stock ticker symbol; and if the telephone call is directed to a business that is located in a different section of the 'State' from that in which the caller is located, the telephone number comprises a two-letter 'State' (State or District of Columbia, Province or Territory, or Caribbean country) abbreviation (indicating the location of the business), followed by a tilde, followed by a one-letter to four-letter stock ticker symbol. Preferably, the second case above, the telephone number comprises a two-letter 'State' abbreviation (indicating the U.S. State or District of Columbia, or Canadian Province or Territory, or Caribbean country in which the business is located), followed by a tilde, followed by a one-letter to four-letter stock ticker symbol, followed by three to six characters, directing the telephone call to a specific communications outlet. If necessary, said one-letter stock ticker symbol is preceded by the letter 'O'.

In another illustrative embodiment, the invention is a system for routing a telephone call having a ten-character telephone number from a caller to a communications device of a business, said system comprising: a routing system for routing the telephone call to said communications device by recognizing the ten character telephone number; wherein said ten character telephone number comprises an abbreviation of the name of the 'State' in which the business is located and an abbreviation of the name of the business. Preferably, the ten character telephone number comprises: a two-letter abbreviation of the name of the 'State', followed by a tilde, followed by a stock ticker symbol comprising one to four upper case letters. Preferably, said stock ticker symbol is followed by three to six characters directing the telephone call to a specific communications outlet.

In another illustrative embodiment, the invention is a system for routing a telephone call having a nine or ten character telephone number from a caller to a communications device of a subscriber, said system comprising: a routing system for routing the telephone call to said communications device by recognizing the nine or ten character telephone number; wherein said nine or ten character telephone number comprises an abbreviation of the name of the subscriber and an abbreviation of the name of the 'State' in which the subscriber has service. Preferably, the nine character telephone number embodiment, the telephone number comprises: a two-letter indication of the subscriber's first and last initials, followed by a two-digit indication of the birth year of the subscriber, followed by a two-letter indication of the 'State" or remaining country in which the subscriber was born, followed by a one-letter indication of the birth month of the subscriber, followed by a two-letter abbreviation of the name of the 'State' or remaining country in which the subscriber has service (the home State), e.g., RM51AZjCA. In the ten-character telephone number embodiment, the single-letter indication of the month in which the subscriber was born (twelve possible choices) is replaced by a two-letter indication of the city in which the subscriber was born (3,800 possible choices), e.g., RM51AZpxCA. Preferably, the nine or ten character telephone number would not include the name of the home 'State' if the call were being fulfilled within that 'State'. Preferably, if the nine or ten character telephone number is a land line number, the two letters used to indicate the name of the subscriber are upper case letters. Preferably, if the nine or ten character telephone number is a cellular number, the two letters used to indicate the name of the subscriber are lower case letters. Preferably, if the birth month of the subscriber is a month having the same first letter as another month, a letter other than the first letter of the month is used as the one-letter indication of one of the months. Preferably, the letters w, x, y and z are used to indicate May, June, July and August, respectively.

In a telecommunications system that is capable of routing telephone calls to a specific communications device of a particular subscriber, an illustrative embodiment of the invention is a system for routing a telephone call from a caller to said specific communications device, said system comprising: means for assigning a telephone number to the particular subscriber; and means for routing the telephone call to the specific communications device of the particular subscriber by recognizing said telephone number; wherein said telephone number is selected from the group consisting of: if the telephone call is directed to a business that is located within the State from which the caller is calling, a first telephone number comprising a tilde followed by a one-character to four-character stock ticker symbol; and if the telephone call is directed to a business that is or may be located outside of the State from which the caller is calling, a second telephone number comprising a two-character out-of-state abbreviation, followed by a tilde, followed by a one-letter to four-letter stock ticker symbol. Preferably, said telephone number comprises a two-letter out-of-State-call State abbreviation, followed by a tilde, followed by a one-letter to four-letter stock ticker symbol or a title symbol, followed by a directive code comprising three to six more digits, a dot and one or more upper case letters, one or more lower case letters, or one or more lower case letters and one or more digits. Preferably, the (three to six) lower case letters are fax or cel. In another embodiment, the (three to six) lower case characters are an owner's or associate's name or a numbered extension, etc.

In a telecommunications system that is capable of routing telephone calls to a specific communications device of a non-business subscriber, an illustrative embodiment of the invention is a system for routing a telephone call from a caller to said specific communications device, said system comprising: means for assigning a telephone number to the non-business subscriber; and means for routing the telephone call to the specific communications device of the non-business subscriber by recognizing said telephone number; wherein said telephone number comprises the non-business subscriber's two-letter initials. Preferably, said two-letter initials comprise two upper-case letters if the specific communications device is a landline telephone, an upper-case letter followed by a lower-case letter if the specific communications device is a facsimile machine, a lower-case letter followed by an upper-case letter if the specific communications device is a monitor displaying special features or two lower-case letters if the specific communications device is a cellular telephone.

In an illustrative embodiment, any combination of upper-case letters and lower-case letters may be used for any type of specific communications device. In this embodiment, the caller presses send after entering the two-letter initials of a local subscriber, and before the call is routed, the two initials are converted into a seven-character embodiment of the telephone number, said seven-character telephone number comprising said two-letter initials, a two-digit indication of the non-business subscriber's birth year, a two-letter indication of the 'State' or remaining country in which said subscriber was born, and a one-letter indication of the non-business subscriber's birth month. In the eight-character embodiment of the local telephone number, the single-letter indication of the month in which the subscriber was born is replaced with a two-character indication of the city in which the subscriber was born. In an alternative embodiment, the two initials are converted into a six-character telephone number, said six-character telephone number comprising said two initials and four letters chosen by the non-business subscriber.

In another illustrative embodiment, the invention is a communication device of a subscriber (e.g., a telephone) that is configured to allow the subscriber to answer two separate telephone numbers without the subscriber having to select a separate telephone line. Preferably, the two separate telephone numbers comprise a business telephone number and a residence telephone number.

In yet another illustrative embodiment, the invention is a telecommunications system comprising: a call routing system and a plurality of telephones that are connected to said call routing system; wherein each of said telephones is situated within an area having an area code; and wherein said call routing system is operated by a software program that accepts one of the subscriber telephones numbers disclosed herein.

In another illustrative embodiment, the invention is a method of processing a telephone call to a subscriber, the method comprising: assigning one of the telephones numbers disclosed herein to the subscriber and routing the telephone call to the subscriber.

In yet another illustrative embodiment, the invention is a method of processing a telephone call to a subscriber, the method comprising: assigning a telephone number to the subscriber and routing the telephone call to the subscriber; wherein said telephone number is selected from the group consisting of: a substantially permanent company telephone number that consists of one to four characters, and a substantially permanent personal telephone number that consists of two initials of the subscriber or the first name of the subscriber; wherein said telephone number is used to direct calls to a landline, a facsimile machine, an interne connection or a cellular device; and wherein said telephone number comprises an area code if the caller is not in the same state as the subscriber and said area code consists of a two-character state designation. In some embodiments, said substantially permanent personal telephone number also consists of either the birth month or the birth city of the subscriber.

In a telecommunications system that is operative to route telephone calls to a specific communications device of a particular business subscriber, an illustrative embodiment of the invention is a routing system for routing a telephone call from a caller to the specific communications device, said routing system comprising: means for assigning a telephone number to the particular business subscriber; and means for routing the telephone call to the specific communications device of the particular business subscriber by recognizing said telephone number; wherein said telephone number consists solely of a character supported by the American Standard Code for Information Interchange character-encoding scheme followed by a character stock ticker symbol. In another embodiment, said telephone number consists of a single non-letter and non-digit character (e.g., a tilde or reverse quote) supported by the American Standard Code for Information Interchange character-encoding scheme followed by a one-character to four-character stock ticker symbol. In another embodiment, said telephone number consists of a tilde followed by a one-character to four-character stock ticker symbol. In another embodiment, said telephone number comprises a two-letter postal State abbreviation followed by a tilde followed by a one-letter to four-letter stock ticker symbol. In another embodiment, said telephone number comprises a two-letter postal State abbreviation followed by a tilde followed by a one-letter to four-letter stock ticker symbol or an abbreviation of a name of a vendor of the particular business subscriber plus either an extension number or the initials of a department. In another embodiment, said telephone number comprises a tilde followed by a zero and one-letter stock ticker symbol. In another embodiment, said first telephone number comprises a two-letter state abbreviation, followed by a tilde, followed by a one-character to four-character stock ticker symbol, followed by three to six digits, directing the telephone call to the specific communications outlet.

In another illustrative embodiment, the invention is a telecommunications system comprising: a call routing system and a plurality of telephones that are connected to said call routing system; wherein each of said telephones is situated within an area having an area code; and wherein said call routing system is operated by a software program that accepts a telephone call from a caller located in an area having a first area code that is directed to telephone number of a business that is located in a second area having a second area code; wherein said telephone number comprises a character supported by the American Standard Code for Information Interchange character-encoding scheme followed by a character stock ticker symbol. In another embodiment, said telephone number includes no area code and comprises a single non-letter and non-digit character supported by the American Standard Code for Information Interchange character-encoding scheme followed by a one-character to four-character stock ticker symbol. In another embodiment, said telephone number includes no area code and comprises a tilde followed by a one-character to four-letter stock ticker symbol. In another embodiment, said telephone number comprises a two-letter postal State abbreviation followed by a tilde followed by a one-letter to four-letter stock ticker symbol. In another embodiment, said telephone number comprises a two-letter postal State abbreviation followed by a tilde followed by a one-letter to four-letter stock ticker symbol plus either an extension number or the initials of a department. In another embodiment, said telephone number comprises a tilde followed by an '0' and one-letter stock ticker symbol. In another embodiment, said first telephone number comprises a two-letter state abbreviation, followed by a tilde, followed by a one-letter to four-letter stock ticker symbol, followed by three to six digits coded to direct the telephone call to a specific communications outlet, such as a company department, or a vendor of company products, or an extension number, or a name, or initials, etc.

In yet another illustrative embodiment, the invention is a method of processing a telephone call to a business subscriber, the method comprising: assigning a telephone number to the business subscriber and routing the telephone call to the business subscriber; wherein said telephone number comprises a character supported by the American Standard Code for Information Interchange character-encoding scheme followed by a stock ticker symbol character or characters. In another embodiment, said telephone number comprises a single non-letter and non-digit character supported by the American Standard Code for Information Interchange character-encoding scheme followed by a one-letter to four-letter stock ticker symbol. In another embodiment, said telephone number comprises a tilde followed by a one-letter to four-letter stock ticker symbol.

In a further illustrative embodiment, the invention is a method for routing a telephone call from a caller to a specific communications device of a particular business subscriber, said method for routing comprising: assigning a telephone number to the particular business subscriber; and routing the telephone call to the specific communications device of the particular business subscriber by recognizing said telephone number; wherein said telephone number comprises a character supported by the American Standard Code for Information Interchange character-encoding scheme followed by a stock ticker symbol character or characters. In another embodiment, said telephone number comprises a single non-letter and non-digit character supported by the American Standard Code for Information Interchange character-encoding scheme followed by a one-character to four-character stock ticker symbol. In another embodiment, said telephone number comprises a tilde followed by a one-letter to four-letter stock ticker symbol.

In a telecommunications system that is operative to route telephone calls to a specific communications device of a particular business subscriber, an illustrative embodiment of the invention is a routing system for routing a telephone call from a caller to the specific communications device, said routing system comprising: means for assigning a telephone number to the particular business subscriber; and means for routing the telephone call to the specific communications device of the particular business subscriber by recognizing said telephone number; wherein said telephone number comprises a tilde, followed by an upper case letter 'O', followed by a one-letter stock ticker symbol.

In a telecommunications system that is capable of routing telephone calls to a specific communications device of a particular business subscriber, another illustrative embodiment of the invention is a system for routing a telephone call from a caller to said specific communications device, said system comprising: means for assigning a telephone number to the particular business subscriber; and means for routing the telephone call to the specific communications device of the particular business subscriber by recognizing said telephone number; wherein, if the telephone call is directed to a business that is located within a 'State' but in a different section of the 'State' (the U.S. State or District of Columbia, or the Canadian Province or Territory, or the Caribbean country) in which the caller is located, said telephone number, dialed within the 'State' comprises, a two-letter abbreviation of the business location, which could be an abbreviation of name of the U.S. State or District of Columbia, or the Canadian Province or Territory, or the Caribbean country in which the business is located, or it could be an abbreviation of the name of a city within any of the above areas in which the business is located, followed by a tilde, followed by a one-character to four-character stock ticker symbol. In another embodiment, said telephone number comprises a two-letter 'State' abbreviation, followed by a tilde, followed by a one-letter to four-letter stock ticker symbol, followed by three to six characters, directing the telephone call to said specific communications device.

In a telecommunications system that is operative to route telephone calls to a specific communications device of a particular subscriber, another illustrative embodiment of the invention is a call routing system for routing a telephone call from a caller to the specific communications device, said routing system comprising: means for assigning a telephone number to the particular subscriber; and means for routing the telephone call to the specific communications device of the particular subscriber by recognizing said telephone number; wherein said telephone number comprises the particular subscriber's two-letter initials, followed by two digits indicating the year in which the particular subscriber was born, followed by a two-letter code indicating the 'State' or remaining country in which the particular subscriber was born, followed by a lower case letter indicating the month in which the particular subscriber was born. In another embodiment, said telephone number comprises the particular subscriber's two-letter initials, followed by two digits indicating the year in which the particular subscriber was born, followed by a two-letter 'State' code or a two-letter remaining country code indicating the 'State' or remaining country in which the particular subscriber was born, followed by a lower case letter indicating the month in which the particular subscriber was born. In another embodiment, said telephone number comprises the particular subscriber's two-letter initials, followed by two digits indicating the year in which the particular subscriber was born, followed by a two-letter upper case 'State' code indicating the 'State' in which the particular subscriber was born or a two-letter upper-case or lower-case remaining country code indicating the remaining country in which the particular subscriber was born, followed by a lower case letter indicating the month in which the particular subscriber was born. In this embodiment, lower-case country codes are used only in the twenty-nine cases in which a remaining country abbreviation (country code) would otherwise be identical to a 'State' abbreviation (country code). In another embodiment, said telephone number comprises the subscriber's two-letter initials, followed by two digits indicating the year in which the particular subscriber was born, followed by a two-letter 'State,' code or remaining country code indicating the location at which the particular subscriber was born, followed by a lower case letter indicating the month in which the particular subscriber was born, followed by a two-letter 'State' code indicating the 'State' of residence of the particular subscriber. In another embodiment, one of said subscriber's two-letter initials is an upper-case letter or a lower-case letter and the other of said particular subscriber's two-letter initials is an upper-case letter or a lower-case letter, with any combination of said upper-case or lower-case letters indicating that the call is directed to a landline telephone number, a facsimile machine number, a special features number, or a cellular telephone number. In another embodiment, both of said two-letter initials are upper-case letters and the call is directed to a landline telephone. In another embodiment, a first of said two-letter initials is an upper-case letter, a second of said two-letter initials is a lower-case letter and the call is directed to a facsimile machine. In another embodiment, a first of said two-letter initials is a lower-case letter, a second of said two-letter initials is an upper-case letter and the call is directed to a special features database. In another embodiment, both of said two-letter initials are lower-case letters and the call is directed to a cellular telephone. In another embodiment, said telephone number comprises the particular subscriber's two-letter initials, followed by two digits that indicate the year in which the particular subscriber was born, followed by a two-letter code indicating the 'State' or remaining country in which the particular subscriber was born, followed by a lower-case letter indicating the month in which the particular subscriber was born.

In a telecommunications system that is operative to route telephone calls to a specific communications device of a particular subscriber, an illustrative embodiment of the invention is a routing system for routing a telephone call from a caller to the specific communications device, said routing system comprising: means for assigning a telephone number to the particular subscriber; and means for routing the telephone call to the specific communications device of the particular subscriber by recognizing said telephone number; wherein said telephone number comprises the subscriber's two-letter initials, followed by four letters chosen by the particular subscriber.

In a telecommunications system that is operative to route telephone calls to a specific communications device of a particular subscriber, another illustrative embodiment of the invention is a routing system for routing a telephone call from a caller to the specific communications device, said routing system comprising: means for assigning a telephone number to the particular subscriber; and means for routing the telephone call to the specific communications device of the particular subscriber by recognizing said telephone number; wherein said telephone number is a permanent local telephone number for the particular subscriber that comprises the particular subscriber's two-letter initials, followed by two digits indicating the year in which the particular subscriber was born, followed by a two-letter 'State' code or a two-letter country code indicating the 'State' or remaining country in which the particular subscriber was born, followed by a two lower case letters indicating the city in which the particular subscriber was born.

In a telecommunications system that is operative to route telephone calls to a specific communications device of a particular subscriber, another illustrative embodiment of the invention is a routing system for routing a telephone call from a caller to the specific communications device, said routing system comprising: means for assigning a telephone number to the particular subscriber; and means for routing the telephone call to the specific communications device of the particular subscriber by recognizing said telephone number; wherein said telephone number comprises a reverse quote, followed by a two-letter abbreviation of the 'State' or remaining country in which the particular subscriber subscribes, followed by a permanent local telephone number for the particular subscriber that comprises the particular subscriber's two-letter initials, followed by two digits indicating the year in which the particular subscriber was born, followed by a two-letter 'State' code or a two-letter remaining country code indicating the 'State' or remaining country in which the particular subscriber was born, followed by a two lower case letters indicating the city in which the particular subscriber was born, followed by a two-letter abbreviation of the city or other location in which the particular subscriber subscribes.

In a telecommunications system that is operative to route telephone calls to a specific communications device of a particular subscriber, another illustrative embodiment of the invention is a routing system for routing a telephone call from a caller to the specific communications device, said routing system comprising: means for assigning a telephone number to the particular subscriber; and means for routing the telephone call to the specific communications device of the particular subscriber by recognizing said telephone number; wherein said telephone number comprises a reverse quote, followed by a two-letter abbreviation of the 'State' or remaining country in which the particular subscriber subscribes, followed by a permanent local telephone number for the particular subscriber that comprises the particular subscriber's two-letter initials, followed by two digits indicating the year in which the particular subscriber was born, followed by a two-letter 'State' code or a two-letter remaining country code indicating the 'State' or remaining country in which the particular subscriber was born, followed by a two-letter abbreviation of the city or other location in which the particular subscriber was born.

In a telecommunications system that is operative to route telephone calls to a specific communications device of a particular subscriber, another embodiment of the invention is a routing system for routing a telephone call from a caller to the specific communications device, said routing system comprising: means for assigning a telephone number to the particular subscriber; and means for routing the telephone call to the specific communications device of the particular subscriber by recognizing said telephone number; wherein said telephone number comprises the particular subscriber's two-letter initials, followed by two characters indicating the year in which the particular subscriber was born, followed by an upper-case two-letter code indicating the 'State' or remaining country in which the particular subscriber was born, followed by a lower-case two-letter code indicating the city in which the particular subscriber was born. In another embodiment, if said telephone call is directed to a 'State' or remaining country that differs from the 'State' or remaining country in which the particular subscriber subscribes, said telephone number further comprises an upper-case two-letter area code. If the area code is within a 'State', the full telephone number is dialed as is. If the area code is that of one of the remaining 218 countries, a reverse quote is dialed plus an abbreviation of the remaining country of residence of the particular subscriber plus the local telephone number. In an illustrative embodiment, the telephone number comprises, as its last two characters, an abbreviation of the city or other location in which the particular subscriber subscribes.

In a telecommunications system that is operative to route telephone calls to a specific communications device of a business subscriber, another illustrative embodiment of the invention is a routing system for routing a telephone call from a caller to the specific communications device, said routing system comprising: means for assigning a telephone number to the business subscriber; and means for routing the telephone call to the specific communications device of the business subscriber by recognizing said telephone number; wherein said telephone number comprises a two-letter state abbreviation, followed by a tilde, followed by a one-letter to four-letter stock ticker symbol, followed by three to six digits, directing the telephone call to said specific communications device the business subscriber.

In yet another illustrative embodiment, the invention is a method of processing a telephone call to a business subscriber, the method comprising: assigning a telephone number to the business subscriber and routing the telephone call to the business subscriber; wherein said telephone number comprises a tilde, followed by an upper case letter 'O', followed by a one-letter stock ticker symbol.

In another illustrative embodiment, the invention is a method for routing a telephone call from a caller to a specific communications device of a particular business subscriber, said method for routing comprising: assigning a telephone number to the particular business subscriber; and routing the telephone call to the specific communications device of the particular business subscriber by recognizing said telephone number; wherein, if the telephone call is directed to a business that is located within a 'State' but in a different section of said 'State'(U.S. State or District of Columbia, or Province or Territory, or Caribbean country) than that in which the caller is located, said telephone number, dialed within said 'State', comprises a two-letter abbreviation of the U.S. State or District of Columbia, or Canadian Province or Territory, or Caribbean country being called, or comprises an abbreviation of a city within said 'State' in which the particular business being called is located, followed by a tilde, followed by a one-character to four-character stock ticker symbol. In another embodiment, said telephone number, dialed within said 'State', comprises a two-letter abbreviation of the U.S. State or District of Columbia, or Canadian Province or Territory, or Caribbean country being called, or comprises an abbreviation of a city within said 'State' in which the particular business being called is located, followed by a tilde, followed by a one-letter to four-letter stock ticker symbol of the particular business, followed by three to six characters, directing the telephone call to said specific communications device.

In another illustrative embodiment, the invention is a method of processing a telephone call to a subscriber, the method comprising: assigning a telephone number to the subscriber and routing the telephone call to the subscriber; wherein said telephone number comprises the subscriber's two-letter initials, followed by two digits indicating the year in which the subscriber was born, followed by a two-letter code indicating the 'State' or remaining country in which the subscriber was born, followed by a lower case letter indicating the month in which the subscriber was born. In another embodiment, said telephone number comprises the subscriber's two-letter initials, followed by two digits indicating the year in which the subscriber was born, followed by a two-letter 'State' code indicating the 'State' in which the subscriber was born or a two-letter remaining country code indicating the remaining country in which the subscriber was born, followed by a lower case letter indicating the month in which the subscriber was born. In another embodiment, said telephone number comprises the subscriber's two-letter initials, followed by two digits indicating the year in which the subscriber was born, followed by a two-letter upper case 'State' code or a two-letter upper-case remaining country code (or a two-letter lower-case remaining country code for one of the twenty-nine remaining countries that would otherwise have the same code as a 'State') indicating the 'State' or remaining country in which the subscriber was born, followed by a lower case letter indicating the month in which the subscriber was born. In another embodiment, said telephone number comprises the subscriber's two-letter initials, followed by two digits indicating the year in which the subscriber was born, followed by a first two-letter 'State' code or remaining country code indicating the 'State' or remaining country which the subscriber was born, followed by a lower case letter indicating the month in which the subscriber was born, followed by a second two-letter 'State' code indicating the 'State' of residence of the subscriber. In another embodiment, one of said subscriber's two-letter initials is an upper-case letter or a lower-case letter and the other of said subscriber's two-letter initials is an upper-case letter or a lower-case letter, with any combination of said upper-case or lower-case letters indicating a landline telephone number, a facsimile machine number, a special features number or a cellular telephone number. In another embodiment, both of said two-letter initials are upper-case letters and the call is directed to a landline telephone. In another embodiment, a first of said two-letter initials is an upper-case letter, a second of said two-letter initials is a lower-case letter and the call is directed to a facsimile machine. In another embodiment, a first of said two-letter initials is a lower-case letter, a second of said two-letter initials is an upper-case letter and the call is directed to a special features database (e.g., to a server that is configured to serve special feature data that is stored in a database). In another embodiment, both of said two-letter initials are lower-case letters and the call is directed to a cellular telephone. In another embodiment, said telephone number comprises the subscriber's two-letter initials, followed by two digits that indicate the year in which the subscriber was born, followed by a two-letter code indicating the 'State' or remaining country in which the subscriber was born, followed by a lower-case letter indicating the month in which the subscriber was born.

In another illustrative embodiment, the invention is a method of processing a telephone call to a subscriber, the method comprising: assigning a telephone number to the subscriber and routing the telephone call to the subscriber; wherein said telephone number comprises the subscriber's two-letter initials, followed by four letters chosen by the subscriber.

In another illustrative embodiment, the invention is a method of processing a telephone call to a subscriber, the method comprising: assigning a telephone number to the subscriber and routing the telephone call to the subscriber; wherein said telephone number is a permanent local telephone number for the subscriber that comprises the subscriber's two-letter initials, followed by two digits indicating the year in which the subscriber was born, followed by a two-letter 'State' code or a two-letter remaining country code indicating the 'State' or remaining country in which the subscriber was born, followed by a two lower case letters indicating the city in which the subscriber was born, followed by a two-letter abbreviation of the city or other location in which the subscriber subscribes.

In another illustrative embodiment, the invention is a method of processing a telephone call to a subscriber, the method comprising: assigning a telephone number to the subscriber and routing the telephone call to the subscriber; wherein said telephone number comprises a reverse quote, followed by a two-letter abbreviation of the 'State' or remaining country in which the subscriber subscribes, followed by a permanent local telephone number for the subscriber that comprises the subscriber's two-letter initials, followed by two digits indicating the year in which the subscriber was born, followed by a two-letter 'State' code or a two-letter remaining country code indicating the 'State' or remaining country in which the subscriber was born, followed by a two lower case letters indicating the city in which the subscriber was born, followed by a two-letter abbreviation of the city or other location in which the subscriber subscribes.

In another illustrative embodiment, the invention is a method of processing a telephone call to a subscriber, the method comprising: assigning a telephone number to the subscriber and routing the telephone call to the subscriber; wherein said telephone number comprises the subscriber's two-letter initials, followed by two digits indicating the year in which the subscriber was born, followed by an upper-case two-letter code indicating the 'State' or remaining country in which the subscriber was born, followed by a lower-case two-letter code indicating the city in which the subscriber was born. In another embodiment, if said telephone call is directed to a 'State' or remaining country that differs from the 'State' or remaining country in which the subscriber subscribes, said telephone number further comprises an upper-case two-letter area code. If said upper-case two-letter area code is that of a 'State', the full telephone number is dialed. If said upper-case two-letter area code is that of one of the remaining 218 countries, a reverse quote is dialed followed by an abbreviation of the remaining country of residence, followed by the telephone number, which contains in its last two characters, an abbreviation of the city or other location in which the subscriber subscribes.

In another illustrative embodiment, the invention is a method of processing a telephone call to a business subscriber, the method comprising: assigning a telephone number to the business subscriber and routing the telephone call to the business subscriber; wherein said telephone number comprises a two-letter 'State' abbreviation or a two-letter remaining country abbreviation, followed by a tilde, followed by a one-letter to four-letter stock ticker symbol, followed by three to six digits, directing the telephone call to a specific outlet of the business subscriber.

Further aspects of the invention will become apparent from consideration of the drawing and the ensuing description of illustrative embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE VIEW OF THE DRAWING

The features of the invention will be better understood by reference to the accompanying drawing which illustrates presently illustrative embodiments of the invention. In the drawing.

The following reference numerals are used to indicate the parts and environment of the invention on the drawing:

| | |
|---|---|
| 2 | telecommunications system |
| 10 | cellular phone |
| 12 | base station, cell site |
| 14 | mobile switching center |
| 16 | land line telephone |
| 18 | public switched telephone network |

DETAILED DESCRIPTION OF THE INVENTION

Figure 1:
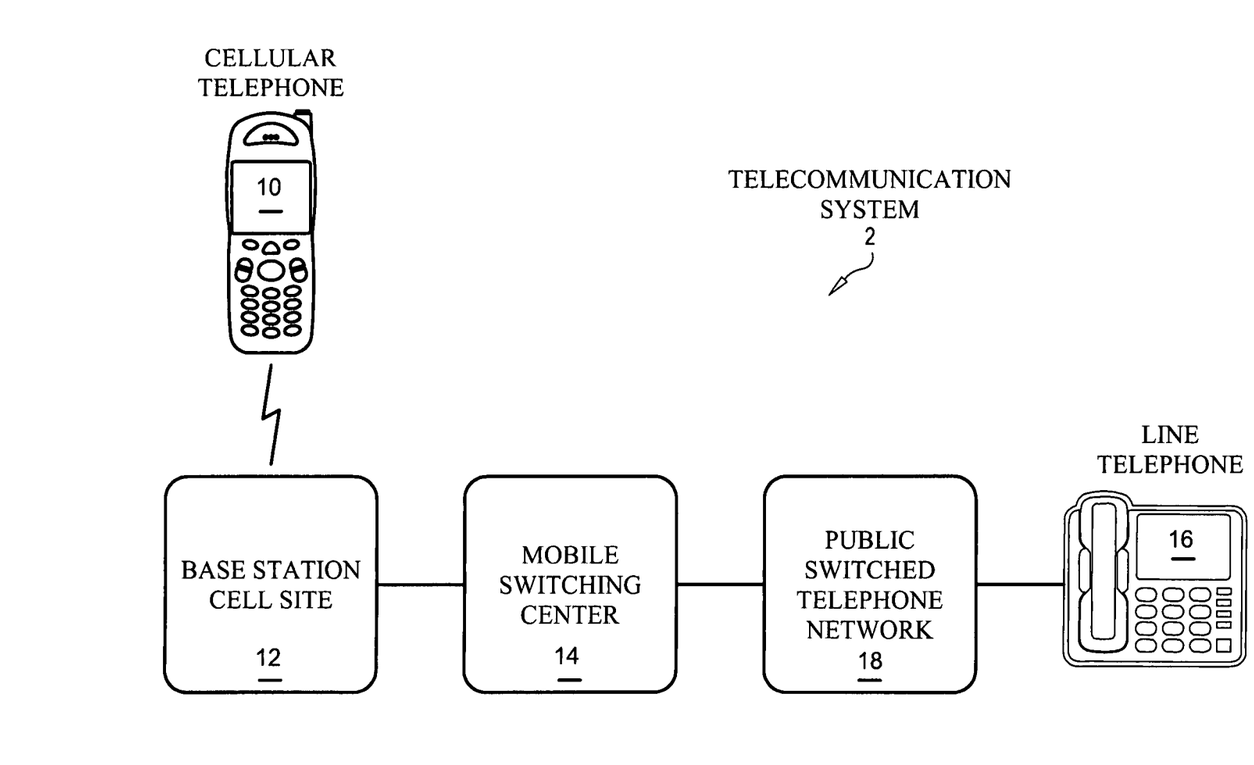
FIG. 1 is a block diagram of a telecommunications system in accordance with an illustrative embodiment of the invention.

Referring to FIG. 1, an illustrative embodiment of telecommunications system 2 is presented. In this embodiment, telecommunications system 2 comprises cellular phone 10, base station or cell site 12, mobile switching center 14, line telephone 16 and public switched telephone network 18. A detailed disclosure of an illustrative embodiment of a telecommunications system is presented in U.S. Pat. Nos. 7,039,174; 7,848,508; and 7,889,855; which disclosures are incorporated by reference as if fully set forth herein.

In an illustrative embodiment, telecommunications system 2 routes telephone calls from caller to said specific communications devices. In this embodiment, telecommunications system 2 comprises means for routing the telephone call to a specific communications device of a particular subscriber by recognizing a telephone number. If the telephone call is directed to a business that is or may be located outside of the State in which the caller is located, the business telephone number comprises a two-character State abbreviation, followed by a tilde, followed by a one-character to four-character stock ticker symbol. Preferably, the business telephone number comprises a two-character State abbreviation, followed by a tilde, followed by a one-letter to four-letter stock ticker symbol, followed by three to six digits, a dot and one or more upper case letters, one or more lower case letters, or one or more lower case letters and one or more digits which direct the telephone call to a specific communications outlet.

In another illustrative embodiment, telecommunications system 2 comprises a routing system for routing a telephone call to a communications device of a non-business subscriber by recognizing a nine or ten character telephone number. In this embodiment, the nine or ten character telephone number comprises an abbreviation of the name of the non-business subscriber and an abbreviation of the name of the State in which the non-business subscriber subscribes to telecommunications system 2. Preferably, the nine character version of the telephone number comprises: a two-letter indication of the non-business subscriber's first and last initials, followed by a two-digit indication of the birth year of the non-business subscriber, followed by a two-letter indication of the 'State' or remaining country in which the non-business subscriber was born, followed by a one-letter indication of the birth month of the non-business subscriber, followed by a two-letter abbreviation of the name of the State in which the non-business subscriber has service. In the ten-character version of the telephone number, the single letter indication of the month in which the non-business subscriber was born is replaced with a two-letter indication of the city in which the non-business subscriber was born. Preferably, the nine or ten character telephone number would not include the name of the State if the call were being fulfilled within the State in which it originated. Preferably, if the nine or ten character telephone number is a land line number, the two letters used to indicate the name of the subscriber are upper case letters. Preferably, if the nine or ten character telephone number is a cellular telephone number, the two letters used to indicate the name of the subscriber are lower case letters. Preferably, if the birth month of the subscriber is a month having the same first letter as another month, a letter other than the first letter of the month is used as the one-letter indication of one of the months. Preferably, the letters w, x, y and z are used to indicate May, June, July and August, respectively.

In another illustrative embodiment, the invention is a method of processing a telephone call to a subscriber, the method comprising: assigning a telephone number to the subscriber and routing the telephone call to the subscriber; wherein said telephone number is either a substantially permanent company telephone number that consists of one to four characters, or a substantially permanent (e.g., life long) personal telephone number that consists of two initials of the subscriber or the first name of the subscriber; wherein said telephone number is used to direct calls to a landline, a facsimile machine, an internet connection or a cellular device; and wherein said telephone number comprises an area code if the caller is not in the same state as the subscriber and said area code consists of a two-character state designation. In some embodiments, said substantially permanent personal telephone number also comprises either the birth month or the birth city of the subscriber.

In another illustrative embodiment, the invention is a system and a method for processing a telephone call. In this embodiment, when a subscriber dials a company ticker symbol preceded by a tilde, such as ~GE, the call is directed to a live operator (or a recording) that determines which area of the company or which vendor selling GE products that the subscriber is seeking and who inputs the telephone number or numbers required for the subscriber to reach the desired destination. In this embodiment, the telephone number includes a State abbreviation (such as NY) followed by ~GE or an abbreviation of a name of a vendor, plus either an extension number, or the initials of a department (such as ACC for accounting), etc.

In the instance of calls to a large company with more than one major set of extension numbers, the above extension number may include an initial letter, such as a or b or c, etc. to specify the department or division required. The problem is that this approach would require eleven characters, such as CA~GOOGaXXX. An alternative embodiment of the invention involves expanding the telephone number from 10 to 11 characters, which would be very beneficial by providing four to seven digits for destinations. In another alternative embodiment, different extension sets of extension numbers are consolidated into one system using all 999 numbers available. Yet another embodiment involves communicating within a company by name, which would also solve the problem. Extensions may be indicated by letters indicating names, initials, or departments, etc. Three letters provide 17,576 choices.

It is not expected to be required, but in cases in which routing of a call involving the direct dialing of a ticker symbol requires inputting of the corresponding State name in addition to the ticker symbol, the State name is preferably provided automatically for each ticker symbol by a memory bank in the system. It is not expected to be required, but each ticker symbol may be modified to include a minimum of two characters, for ticker dialing purposes only, by adding an upper case letter 'O', such as 'OF' for Ford Motor, etc. In this embodiment, modification of the ticker symbol is accomplished automatically by a memory bank in the system.

Many variations of the invention will occur to those skilled in the art. Some variations include telephone numbers that comprise an indication of a stock ticker symbol of a business subscriber. Other variations call for telephone numbers that comprise an indication of the name of a non-business subscriber. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. In a telecommunications system that is operative to route telephone calls to a specific communications device of a particular business subscriber, a routing system for routing a telephone call from a caller to the specific communications device, said routing system comprising:
   means for assigning a telephone number to the particular business subscriber; and
   means for routing the telephone call to the specific communications device of the particular business subscriber by recognizing said telephone number;
   wherein said means for routing comprises a signal processor that receives a signal containing said telephone number and a switching matrix that routes the telephone call; and
   wherein said telephone number comprises a tilde, followed by an upper case letter 'O', followed by a one-letter stock ticker symbol.

2. In a telecommunications system that is capable of routing telephone calls to a specific communications device of a particular business subscriber, a system for routing a telephone call from a caller to said specific communications device, said system comprising:
   means for assigning a telephone number to the particular business subscriber; and
   means for routing the telephone call to the specific communications device of the particular business subscriber by recognizing said telephone number;
   wherein said means for routing comprises a signal processor that receives a signal containing said telephone number and a switching matrix that routes the telephone call; and
   wherein, if the telephone call is directed to a business that is located in a 'State', said telephone number comprises a two-letter abbreviation of said 'State' or an abbreviation of a city within said 'State' in which said business is located, followed by a tilde, followed by a one-character to four-character stock ticker symbol.

3. The routing system of claim 2 wherein said telephone number comprises a two-letter abbreviation of said 'State' or an abbreviation of the city within said 'State' in which said business is located, followed by a tilde, followed by a one-letter to four-letter stock ticker symbol, followed by three to six characters, directing the telephone call to said specific communications device.

4. In a telecommunications system that is operative to route telephone calls to a specific communications device of a particular subscriber, a call routing system for routing a telephone call from a caller to the specific communications device, said routing system comprising:
   means for assigning a telephone number to the particular subscriber; and
   means for routing the telephone call to the specific communications device of the particular subscriber by recognizing said telephone number,
   wherein said telephone number comprises the particular subscriber's two-letter initials, followed by two characters indicating the year in which the particular subscriber was born, followed by a two-letter code indicating the 'State' or remaining country in which the particular subscriber was born, followed by a lower case letter indicating the month in which the particular subscriber was born.

5. The call routing system of claim 4 wherein said telephone number comprises the particular subscriber's two-letter initials, followed by two digits indicating the year in which the particular subscriber was born, followed by a two-letter 'State' code indicating the 'State' in which the particular subscriber was born or a two-letter remaining country code indicating the remaining country in which the particular subscriber was born, followed by a lower case letter indicating the month in which the particular subscriber was born.

6. The call routing system of claim 5 wherein said telephone number comprises the particular subscriber's two-letter initials, followed by two digits indicating the year in which the particular subscriber was born, followed by a two-letter upper case 'State' code indicating the 'State' in which the particular subscriber was born or a two-letter upper-case or a lower-case remaining country code indicating the remaining country in which the particular subscriber was born, followed by a lower case letter indicating the month in which the particular subscriber was born.

7. The call routing system of claim 4 wherein said telephone number comprises the subscriber's two-letter initials, followed by two digits indicating the year in which the particular subscriber was born, followed by a two-letter 'State' code or remaining country code indicating the location at which the particular subscriber was born, followed by a lower case letter indicating the month in which the particular subscriber was born, followed by a two-letter 'State' code indicating the 'State' of residence of the particular subscriber.

8. The call routing system of claim 4 wherein one of said subscriber's two-letter initials is an upper-case letter or a lower-case letter and the other of said particular subscriber's two-letter initials is an upper-case letter or a lower-case letter, with any combination of said upper-case or lower-case letters indicating that the call is directed to a landline telephone number, a facsimile machine number, a special features number, or a cellular telephone number.

9. The call routing system of claim 8 wherein both of said two-letter initials are upper-case letters and the call is directed to a landline telephone.

10. The call routing system of claim 8 wherein a first of said two-letter initials is an upper-case letter, a second of said two-letter initials is a lower-case letter and the call is directed to a facsimile machine.

11. The call routing system of claim 8 wherein a first of said two-letter initials is a lower-case letter, a second of said two-letter initials is an upper-case letter and the call is directed to a special features database.

12. The call routing system of claim 8 wherein both of said two-letter initials are lower-case letters and the call is directed to a cellular telephone.

13. The call routing system of claim 4 wherein said telephone number comprises the particular subscriber's two-letter initials, followed by two digits that indicate the year in which the particular subscriber was born, followed by a two-letter code indicating a 'State' or a remaining country in which the particular subscriber was born, followed by a lower-case letter indicating the month in which the particular subscriber was born.

14. In a telecommunications system that is operative to route telephone calls to a specific communications device of a particular subscriber, a routing system for routing a telephone call from a caller to the specific communications device, said routing system comprising:
   means for assigning a telephone number to the particular subscriber; and
   means for routing the telephone call to the specific communications device of the particular subscriber by recognizing said telephone number;

wherein said means for routing comprises a signal processor that receives a signal containing said telephone number and a switching matrix that routes the telephone call; and wherein said telephone number comprises the particular subscriber's two-letter initials, followed by four letters chosen by the particular subscriber.

15. In a telecommunications system that is operative to route telephone calls to a specific communications device of a particular subscriber, a routing system for routing a telephone call from a caller to the specific communications device, said routing system comprising:

means for assigning a telephone number to the particular subscriber; and means for routing the telephone call to the specific communications device of the particular subscriber by recognizing said telephone number;

wherein said telephone number is a permanent local telephone number for the particular subscriber that comprises the particular subscriber's two-letter initials, followed by two digits indicating the year in which the particular subscriber was born, followed by a two-letter 'State' code or a two-letter remaining country code indicating the 'State' or the remaining country in which the particular subscriber was born, followed by a two lower case letters indicating the city in which the particular subscriber was born.

16. In a telecommunications system that is operative to route telephone calls to a specific communications device of a particular subscriber, a muting system for muting a telephone call from a caller to the specific communications device, said routing system comprising:

means for assigning a telephone number to the particular subscriber; and means for routing the telephone call to the specific communications device of the particular subscriber by recognizing said telephone number;

wherein said telephone number comprises a reverse quote, followed by a two-letter abbreviation of the 'State' or the remaining country in which the particular subscriber subscribes, followed by a permanent local telephone number for the particular subscriber that comprises the particular subscriber's two-letter initials, followed by two digits indicating the year in which the particular subscriber was born, followed by a two-letter 'State' code or a two-letter remaining country code indicating the 'State' or the remaining country in which the particular subscriber was born, followed by a two lower case letters indicating the city in which the particular subscriber was born, followed by a two-letter abbreviation of the city or other location in which the particular subscriber subscribes.

17. In a telecommunications system that is operative to route telephone calls to a specific communications device of a particular subscriber, a routing system for routing a telephone call from a caller to the specific communications device, said routing system comprising:

means for assigning a telephone number to the particular subscriber; and means for routing the telephone call to the specific communications device of the particular subscriber by recognizing said telephone number;

wherein said telephone number comprises a reverse quote, followed by a two-letter abbreviation of the 'State' or the remaining country in which the particular subscriber subscribes, followed by a permanent local telephone number for the particular subscriber that comprises the particular subscriber's two-letter initials, followed by two digits indicating the year in which the particular subscriber was born, followed by a two-letter 'State' code or a two-letter remaining country code indicating the 'State' or the remaining country in which the particular subscriber was born, followed by two lower case letters indicating the city in which the particular subscriber was born, followed by a two-letter abbreviation of the city or other location in which the particular subscriber subscribes.

18. In a telecommunications system that is operative to route telephone calls to a specific communications device of a particular subscriber, a routing system for routing a telephone call from a caller to the specific communications device, said routing system comprising:

means for assigning a telephone number to the particular subscriber; and means for routing the telephone call to the specific communications device of the particular subscriber by recognizing said telephone number;

wherein said telephone number comprises the particular subscriber's two-letter initials, followed by two characters indicating the year in which the particular subscriber was born, followed by an upper-case two-letter code indicating the 'State' or remaining country in which the particular subscriber was born, followed by a lower-case two-letter code indicating the city in which the particular subscriber was born.

19. The routing system of claim 18 wherein if said telephone call is directed to a 'State' or remaining country that differs from the 'State' or remaining country in which the particular subscriber subscribes, said telephone number further comprises an upper-case two-letter area code.

20. In a telecommunications system that is operative to route telephone calls to a specific communications device of a business subscriber, a routing system for routing a telephone call from a caller to the specific communications device, said routing system comprising:

means for assigning a telephone number to the business subscriber; and means for routing the telephone call to the specific communications device of the business subscriber by recognizing said telephone number;

wherein said means for routing comprises a signal processor that receives a signal containing said telephone number and a switching matrix that routes the telephone call; and wherein said telephone number comprises a two-letter 'State' abbreviation, followed by a tilde, followed by a one-letter to four-letter stock ticker symbol, followed by three to six digits, directing the telephone call to the business subscriber.

21. A method of processing a telephone call to a business subscriber, the method comprising:

assigning a telephone number to the business subscriber and routing the telephone call to the business subscriber;

wherein routing the telephone call comprises processing a signal that contains said telephone number and activating a switching matrix that routes the telephone call; and wherein said telephone number comprises a tilde, followed by an upper case letter 'O', followed by a one-letter stock ticker symbol.

22. A method for routing a telephone call from a caller to a specific communications device of a particular business subscriber, said method for routing comprising:

assigning a telephone number to the particular business subscriber; and routing the telephone call to the specific communications device of the particular business subscriber by recognizing said telephone number;
wherein routing the telephone call comprises processing a signal that contains said telephone number and activating a switching matrix that routes the telephone call; and
wherein, if the telephone call is directed to a business that is located in a 'State', said telephone number comprises a two-letter abbreviation of said 'State', followed by a tilde, followed by a one-character to four-character stock ticker symbol.

23. The method for routing of claim 18 wherein said telephone number comprises a two-letter 'State' abbreviation, followed by a tilde, followed by a one-letter to four-letter stock ticker symbol, followed by three to six characters, directing the telephone call to said specific communications device.

24. A method of processing a telephone call to a subscriber, the method comprising:
assigning a telephone number to the subscriber and routing the telephone call to the subscriber;
wherein routing the telephone call comprises processing a signal that contains said telephone number and activating a switching matrix that routes the telephone call; and
wherein said telephone number comprises the subscriber's two-letter initials, followed by two characters indicating the year in which the subscriber was born, followed by a two-letter code indicating the 'State' or remaining country in which the subscriber was born, followed by a lower case letter indicating the month in which the subscriber was born.

25. The method of claim 24 wherein said telephone number comprises the subscriber's two-letter initials, followed by two digits indicating the year in which the subscriber was born, followed by a two-letter 'State' code indicating the 'State' in which the subscriber was born or a two-letter remaining country code indicating the remaining country in which the subscriber was born, followed by a lower case letter indicating the month in which the subscriber was born.

26. The method of claim 24 wherein said telephone number comprises the subscriber's two-letter initials, followed by two digits indicating the year in which the subscriber was born, followed by a two-letter upper case 'State' code indicating the 'State' in which the subscriber was born or a two-letter upper-case or lower-case remaining country code indicating the remaining country in which the subscriber was born, followed by an upper-case letter indicating the month in which the subscriber was born.

27. The method of claim 24 wherein said telephone number comprises the subscriber's two-letter initials, followed by two digits indicating the year in which the subscriber was born, followed by a first two-letter 'State' code or remaining country code indicating the 'State' or remaining country which the subscriber was born, followed by a lower case letter indicating the month in which the subscriber was born, followed by followed by a second two-letter 'State' code indicating the 'State' of residence of the subscriber.

28. The method of claim 24 wherein one of said subscriber's two-letter initials is an upper-case letter or a lower-case letter and the other of said subscriber's two-letter initials is an upper-case letter or a lower-case letter, with any combination of said upper-case or lower-case letters indicating a landline telephone number, a facsimile machine number, a special features number or a cellular telephone number.

29. The method of claim 24 wherein both of said two-letter initials are upper-case letters and the call is directed to a landline telephone.

30. The method of claim 28 wherein a first of said two-letter initials is an upper-case letter, a second of said two-letter initials is a lower-case letter and the call is directed to a facsimile machine.

31. The method of claim 28 wherein a first of said two-letter initials is a lower-case letter, a second of said two-letter initials is an upper-case letter and the call is directed to a special features database.

32. The method of claim 28 wherein both of said two-letter initials are lower-case letters and the call is directed to a cellular telephone.

33. The method of claim 24 wherein said telephone number comprises the subscriber's two-letter initials, followed by two digits that indicate the year in which the subscriber was born, followed by a two-letter code indicating the 'State' or remaining country in which the subscriber was born, followed by a lower-case letter indicating the month in which the subscriber was born.

34. A method of processing a telephone call to a subscriber, the method comprising:
assigning a telephone number to the subscriber and routing the telephone call to the subscriber;
wherein routing the telephone call comprises processing a signal that contains said telephone number and activating a switching matrix that routes the telephone call; and
wherein said telephone number comprises the subscriber's two-letter initials, followed by four letters chosen by the subscriber.

35. A method of processing a telephone call to a subscriber, the method comprising:
assigning a telephone number to the subscriber and routing the telephone call to the subscriber,
wherein said telephone number is a permanent local telephone number for the subscriber that comprises the subscriber's two-letter initials, followed by two digits indicating the year in which the subscriber was born, followed by a two-letter 'State' code indicating the 'State' in which the subscriber was born or a two-letter remaining country code indicating the remaining country in which the subscriber was born, followed by a two lower case letters indicating the city in which the subscriber was born.

36. A method of processing a telephone call to a subscriber, the method comprising:
assigning a telephone number to the subscriber and routing the telephone call to the subscriber,
wherein said telephone number comprises a reverse quote, followed by a two-letter abbreviation of the 'State' or remaining country in which the subscriber subscribes, followed by a permanent local telephone number for the subscriber that comprises the subscriber's two-letter initials, followed by two digits indicating the year in which the subscriber was born, followed by a two-letter 'State' code indicating the 'State' in which the subscriber was born or a two-letter remaining country code indicating the remaining country in which the subscriber was born, followed by a two lower case letters indicating the city in which the subscriber was born, followed by a two-letter abbreviation of the city or other location in which the particular subscriber subscribes.

37. A method of processing a telephone call to a subscriber, the method comprising:
assigning a telephone number to the subscriber and routing the telephone call to the subscriber,
wherein said telephone number comprises a reverse quote, followed by a two-letter abbreviation of the 'State' or remaining country in which the subscriber subscribes, followed by a permanent local telephone number for the subscriber that comprises the subscriber's two-letter initials, followed by two digits indicating the year in which the subscriber was born, followed by a two-letter 'State' code indicating the 'State' in which the particular subscriber was born or a two-letter remaining country code indicating the remaining country in which the subscriber was born, followed by a two lower case letters indicating the city in which the subscriber was born. followed by a two-letter abbreviation of the city or other location in which the particular subscriber subscribes.

38. A method of processing a telephone call to a subscriber, the method comprising:
   assigning a telephone number to the subscriber and routing the telephone call to the subscriber;
   wherein routing the telephone call comprises processing a signal that contains said telephone number and activating a switching matrix that routes the telephone call; and
   wherein said telephone number comprises the subscriber's two-letter initials, followed by two characters indicating the year in which the subscriber was born, followed by an upper-case two-letter code indicating the 'State' or remaining country in which the subscriber was born, followed by a lower-case two-letter code indicating the city in which the subscriber was born.

39. The method of claim 38 wherein if said telephone call is directed to a 'State' or that differs from the 'State' or remaining country in which the subscriber subscribes, said telephone number further comprises an upper-case two-letter area code.

40. A method of processing a telephone call to a business subscriber, the method comprising:
   assigning a telephone number to the business subscriber and muting the telephone call to the business subscriber;
   wherein said telephone number comprises a two-letter 'State' abbreviation, followed by a tilde, followed by a one-letter to four-letter stock ticker symbol, followed by three to six digits, directing the telephone call to the business subscriber.

41. In a telecommunications system that is operative to route telephone calls to a specific communications device of a particular subscriber, a routing system for routing a telephone call from a caller to the specific communications device, said routing system comprising:
   means for assigning a telephone number to the particular subscriber; and
   means for routing the telephone call to the specific communications device of the particular subscriber by recognizing said telephone number;
   wherein said means for routing comprises a signal processor that receives a signal containing said telephone number and a switching matrix that routes the telephone call; and
   wherein said telephone number comprises a reverse quote, followed by a two-letter abbreviation of the 'State' or remaining country or city in which the particular subscriber subscribes, followed by a local telephone number for the particular subscriber.

42. The routing system of claim 41 wherein said local telephone number comprises the particular subscriber's upper-case two-letter initials, followed by two digits indicating the year in which the particular subscriber was born, followed by an upper-case two-letter code indicating the 'State' or remaining country in which the particular subscriber was born, followed by a lower case letter indicating the month in which the particular subscriber was born, followed by a two-letter upper-case abbreviation of the 'State', country or Province of service of the particular subscriber or followed by a two-letter abbreviation of the city of service comprising an upper-case letter followed by a lower-case letter.

43. A method of processing a telephone call to a subscriber, the method comprising:
   assigning a telephone number to the subscriber and routing the telephone call to the subscriber;
   wherein routing the telephone call comprises processing a signal that contains said telephone number and activating a switching matrix that routes the telephone call; and
   wherein said telephone number comprises a reverse quote, followed by a two-letter abbreviation of the 'State' or remaining country or city in which the subscriber subscribes, followed by a local telephone number for the subscriber.

44. The method of claim 43 wherein said local telephone number comprises the particular subscriber's two-letter initials, followed by two digits indicating the year in which the particular subscriber was born, followed by a two-letter code indicating the 'State' or remaining country in which the particular subscriber was born, followed by a lower case letter indicating the month in which the particular subscriber was born, followed by a two-letter upper-case abbreviation of the 'State', country, or Province of service of the particular subscriber, or followed by a two-letter abbreviation of the city of service, comprising an upper-case letter followed by a lower-case letter.

* * * * *